United States Patent [19]
Nitatori et al.

[11] Patent Number: 5,046,042
[45] Date of Patent: Sep. 3, 1991

[54] DATA PROCESSING SYSTEM

[75] Inventors: Takashi Nitatori; Hirokazu Kato; Takatoshi Okumura; Shigemitsu Yamaoka, all of Hamamatsu, Japan

[73] Assignee: Yamaha Corporation, Hamamatsu, Japan

[21] Appl. No.: 846,925

[22] Filed: Mar. 24, 1986

[30] Foreign Application Priority Data

Mar. 25, 1985 [JP] Japan .................................. 60-60459

[51] Int. Cl.⁵ .............................................. G06F 3/06
[52] U.S. Cl. ...................................... 364/900; 360/48; 360/19.1
[58] Field of Search ... 364/200MS File, 900 MS File; 340/750, 798, 747; 360/48, 49, 10.1, 19.1, 43, 18, 121, 20, 27; 369/48-50, 59, 94, 95; 358/341-343, 348

[56] References Cited

U.S. PATENT DOCUMENTS

| | | | |
|---|---|---|---|
| 4,142,209 | 2/1979 | Hedlund et al. | 358/128 |
| 4,205,389 | 5/1980 | Heartz | 364/521 X |
| 4,227,213 | 10/1980 | Isobe | 358/343 |
| 4,286,281 | 8/1981 | Suzuki | 358/4 |
| 4,348,699 | 9/1982 | Tsuchiya et al. | 360/51 X |
| 4,360,876 | 11/1982 | Girault et al. | 364/521 X |
| 4,404,554 | 9/1983 | Tweedy, Jr. et al. | 340/726 X |
| 4,408,181 | 10/1983 | Nakayama | 364/900 |
| 4,475,104 | 10/1984 | Shen | 364/521 X |
| 4,558,375 | 12/1985 | Sontheimer | 369/50 X |
| 4,601,003 | 7/1986 | Yoneyama et al. | 364/900 X |
| 4,630,231 | 12/1986 | Hirata et al. | 358/342 X |
| 4,647,985 | 3/1987 | Yokosawa | 358/343 X |
| 4,672,471 | 6/1987 | Gouda | 358/341 |
| 4,692,816 | 9/1987 | Sugiyama et al. | 360/19.1 X |
| 4,703,369 | 10/1987 | Moriyama et al. | 360/19.1 X |
| 4,757,393 | 7/1988 | Dakin et al. | 360/19.1 X |
| 4,811,280 | 3/1989 | Berkowitz | 369/48 X |

Primary Examiner—David L. Clark
Attorney, Agent, or Firm—Spensley, Horn, Jubas & Lubitz

[57] ABSTRACT

A data processing system processes digital information representing, for example, an image and supplied at a lower transfer rate from a data source such as an optical disc unit, to produce data in such a form as to be efficiently used by a device of a higher transfer rate such as a CRT display unit. The digital information includes a plurality of groups of data each representing, for example, a portion or a window of the image and added with control data for defining characteristics thereof. While the digital information is read out at a constant entire transfer rate, the plurality of groups of data are transferred at respective transfer rates which vary with a lapse of time. The control data of each group of data is separated therefrom, and the group of data and the separated control data are stored into first and second memories. The groups of data stored in the first memory are processed in accordance with the results of analysis of the control data stored in the second memory to form data in such a form as to be efficiently used by the device of the higher transfer rate.

9 Claims, 5 Drawing Sheets

| | ON/OFF 31 | SIZE 32 | PRIORITY 33 | X, Y 34 | RAM OFFSET 35 |
|---|---|---|---|---|---|
| 1 | ON | Xℓ, Yℓ | 3 | X1, Y1 | 200 H |
| 2 | OFF | --- | --- | --- | --- |
| --- | | --- | --- | --- | --- |
| 16 | ON | Xa, Yb | 7 | a, b | 1000 H |

FIG.5

DATA PROCESSING SYSTEM

BACKGROUND OF THE INVENTION

1. Field of the Invention

This invention relates to a data processing system for efficiently processing data under a limited data transfer rate and/or a limited memory capacity, and more particularly to a data processing system for processing data supplied at a lower transfer rate from a data source such as an optical disc unit, to produce data in such a form as to be efficiently used by a device of a higher transfer rate such as a CRT display unit.

In recent years, optical discs such as compact discs have been developed and are extensively used as recording media for audio signals. In general, such an optical disc not only has a large memory capacity (for example, several megabytes per disc) but also is high in data transfer rate (for example, 150 kilobytes per second) and easy to handle. And therefore, an optical disc can also be used as a recording medium of other digital information, and is particularly suitable for use as recording means for an image processing unit.

Although a compact disc is superior in memory capacity and transfer rate, as described above, it has still been impossible for a compact disc to store data representative of an image whose pattern continuously varies over a long period of time.

As is well known, the transfer rate of data read from a compact disc is 150 kilobytes per second in the case of 60-minute recording type and 300 kilobytes per second in the case of 30-minute recording type. However, in order to display an image comparable in quality with those displayed on ordinary television sets, the data representative of the image must be fed to a display unit at a transfer rate more than a hundred times greater than the above-mentioned transfer rates of a compact disc. Thus, to display a motion image of a practical use in accordance with data read from a compact disc, the data necessarily be processed.

A series of images actually displayed on a display unit of, for example, a computer system may include a scene in which a motion of the image must be emphasized even at the sacrifice of a resolution of the image and may include a scene in which a resolution of the image must be enhanced even at the sacrifice of a motion of the image. Thus, display characteristics of an actual image such as a motion and a resolution generally vary in accordance with the lapse of time.

SUMMARY OF THE INVENTION

It is an object of the present invention to provide a data processing system in which a transfer rate of constituent data is efficiently controlled while a transfer rate of the entire data is limited.

It is another object of the present invention to provide a data processing system in which data supplied thereto at a lower transfer rate from a data source such as an optical disc unit, can be converted to data in such a form as to be efficiently used by a device of a higher transfer rate such as a CRT display unit.

According to an aspect of the invention, there is provided a data processing system comprising digital information outputting circuitry for outputting digital information including a plurality of groups of data at a constant transfer rate, each of the plurality of groups of data being added with control data for defining characteristics of the each of the plurality of groups of data, transfer rates of the plurality of groups of data outputted at the constant transfer rate from the outputting circuitry vary with a lapse of time; and data processing means responsive to each of the plurality of groups of data for separating the control data therefrom and analyzing the separated control data, the data processing circuitry processing the each of the plurality of groups of data in accordance with results of the analysis of the separated control data.

BRIEF DESCRIPTION OF THE DRAWINGS

FIGS. 3-(a) to 3-(f) are illustrations showing formats of various data contained in the digital information 1 of FIG. 1;

DESCRIPTION OF THE PREFERRED EMBODIMENT OF THE INVENTION

A data processing system provided in accordance with one embodiment of the present invention will now be described with reference to the accompanying drawings.

Figure 1:
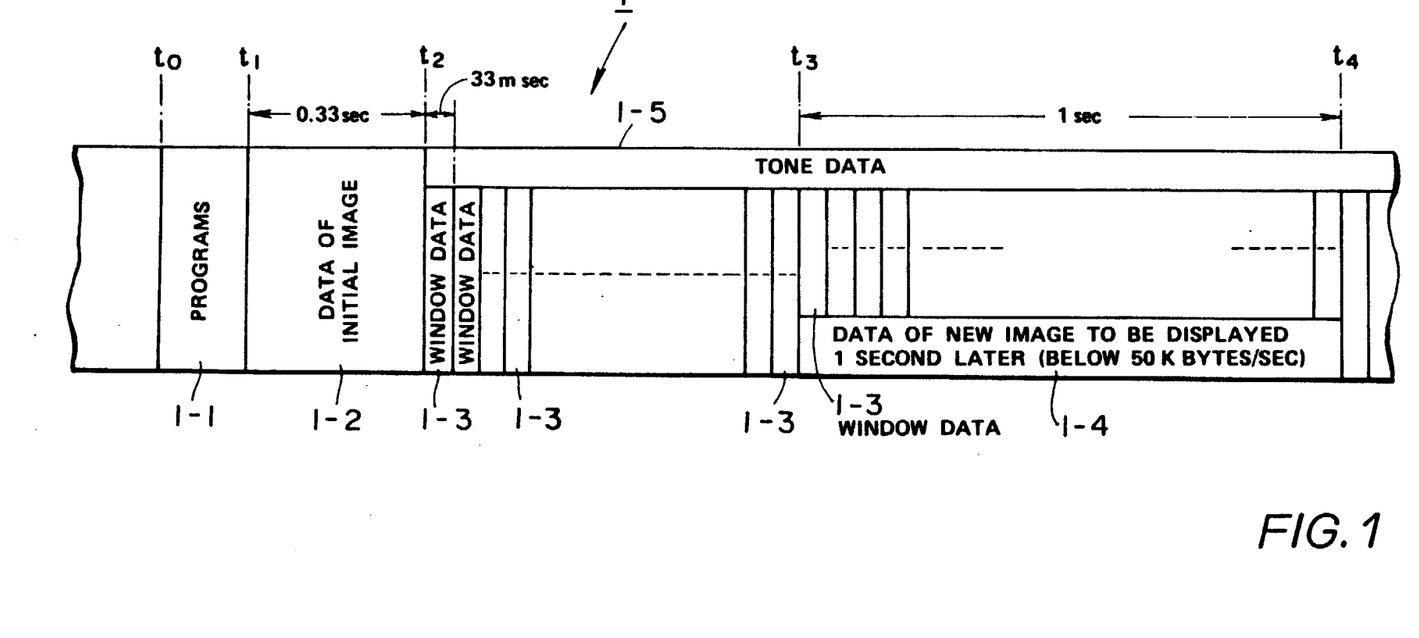
FIG. 1 is a diagrammatical illustration showing one example of digital information 1 read from a compact disc and representative of an image to be displayed of a display unit.

FIG. 1 is a diagrammatical illustration of digital information 1 representative of an image which is read at a constant transfer rate (for example, 150 kilobytes per second) from a compact disc. From FIG. 1, it will be appreciated in what order a plurality of groups of data constituting the digital information 1 are transferred and how the constant transfer rate is shared by the groups of data. The abscissa of FIG. 1 represents time and the ordinate thereof represents data transferred within a unit of time which corresponds to the transfer rate.

The transfer of data is started at time $t_0$, and during a period from the time $t_0$ to time $t_1$, only data 1-1 representative of programs to be initially loaded onto a central processing unit (CPU) as later described is transferred. During a time period of, for example 0.33 second, from the time $t_1$ to time $t_2$, data 1-2 of, for example 50 kilobytes, representative of an image to be initially displayed on an entire screen of a display unit is transferred, whereby the initial image is displayed. From the time $t_2$ to time $t_3$, data 1-5 representative of tones to be generated and a plurality of groups of data 1-3 each representative of an image to be displayed within a corresponding window on the screen are transferred in parallel. In consequence, the tones are generated and motion images are displayed in some portions of the initial image on the screen. During a time period from the time $t_3$ to time $t_4$, the tone data 1-5, the window data 1-3 and data 1-4 representative of a new image to be displayed on the entire screen in place of the initial image are transferred in parallel. The transfer of the image data 1-3 is completed at the time $t_4$, whereupon the initial image on he screen is replaced by the new image.

Thus, each of the different groups of data 1-1 to 1-5 is transferred at its own transfer rate assigned. In other words, the data 1-1 to 1-5 are trade-off modulated.

Figure 2:
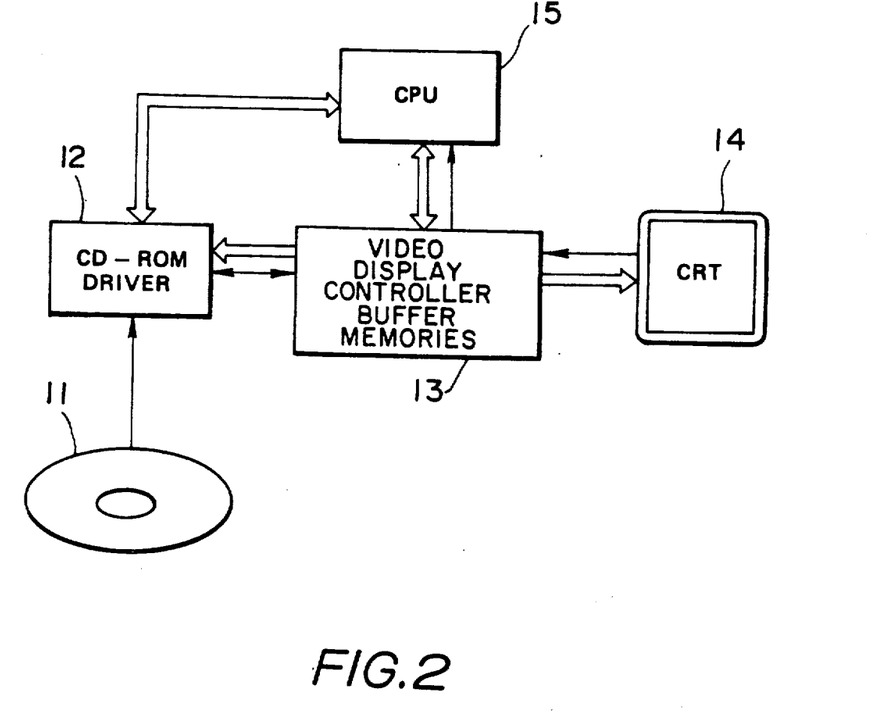
FIG. 2 is a block diagram of a data processing system provided in accordance with one embodiment of the present invention.

FIG. 2 shows a block diagram of the data processing system. The system comprises a compact disc 11 on which the digital information 1 of about 540 megabytes is recorded in accordance with the format shown in FIG. 1 (the compact disc 11 is hereinafter referred to as "CD-ROM"). The digital information 1 is read from the CD-ROM 11 at transfer rate of 150 kilobytes per second in the case of the CD-ROM 11 being of 60-minute recording type, and at a transfer rate of 300 kilobytes per second in the case of the CD-ROM 11 being of 30-minute recording type.

As described, the CD-ROM 11 is recorded with digital information 1 including various data such as the program data 1-1, initial image data 1-2, a plurality of window data 1-3, new image data 1-4, tone data 1-5 and so on in accordance with the format shown in FIG. 1. The CD-ROM 11 i also recorded with data representative of various commands such as one for causing one or more of the windows on the screen to be moved.

Figure 3:
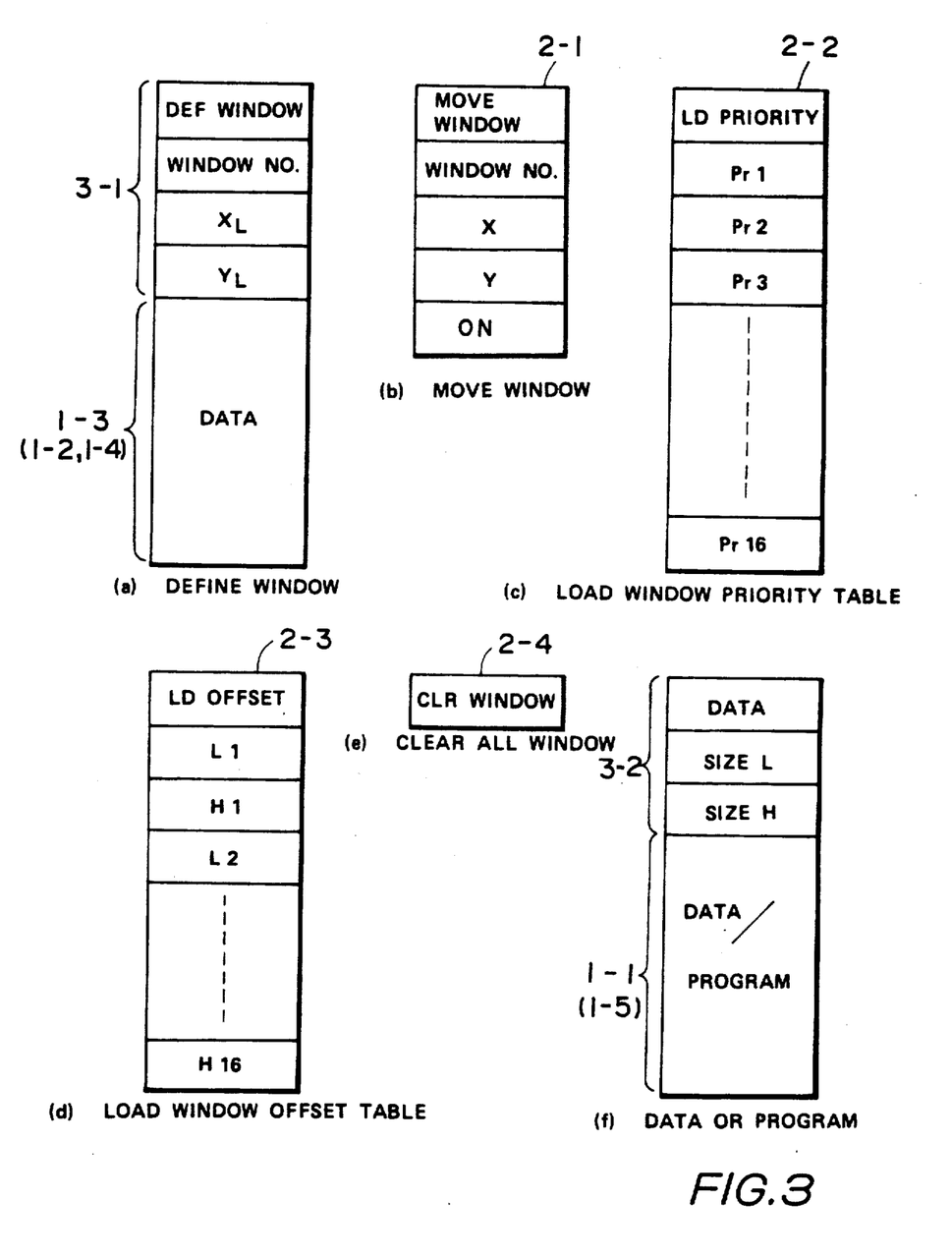

Each of the window data 1-3 is added with a header containing control data 3-1, as shown in FIG. 3-(a). The control data 3-1 is composed of data "DEF Window" indicating that the data involved is a window data 1-3, a window number, and a pair of data "$X_L$" and "$Y_L$" representative of the size of the window. The data "$X_L$" represents a length of the window in the horizontal direction and the data YL represents a length of the window in the vertical direction. The initial image data 1-2 and the new image data 1-4 are recorded on and transferred from the compact disc 11 in the same format as that shown in FIG. 3-(a).

Each of the program data 1-1 and other data to be transferred to a CPU 15 (later described) is added with a header containing control data 3-2, as shown in FIG. 3-(f). The control data 3-2 includes data "DATA" indicating that the data involved is data to be transferred to the CPU 15, and data "Size L, Size H" representative of the size of an image on the screen produced from the data to be transferred to the CPU 15.

FIGS. 3-(b) to 3-(e) show formats of various commands 2 which are each composed only of a header.

A command 2-1 shown in FIG. 3-(b) is to cause one of the windows designated thereby to be moved on the screen. The command 2-1 includes data "Move Window" indicating that this data is a move command 2-1, a window number designating one of the windows to be moved, a pair of data "X" and "Y" representative of the position of the designated window (that is, the X and Y coordinates of the upper-left corner position of the designated window), and data "ON" indicating that the designated window is to be displayed.

A command 2-2 shown in FIG. 3-(c) is provided for determining the priority of each of the sixteen windows. The command 2-2 includes data "LD Priority" indicating that this data is a command 2-2, and data "Pr1" to "Pr16" each representing the priority of a respective one of the sixteen windows. When two or more of the windows overlap on the screen, only the window having the highest priority is displayed on the screen. In other words, the higher the priority is, the shallower position on the screen the window is displayed. Thus, an image can be displayed on the screen as if it has a depth.

A command 2-3 shown in 3-(d) is provided for designating the initial display position or the offset of each of the windows. The command 2-3 includes data "LD offset" indicating that this command is the command 2-3, and data "L1", "H1", "L2", . . . "H16" representative of the initial display positions of the sixteen windows. For example, X and Y coordinates of the upper-left corner position of the first window are designated by the data "L1" and "H1", X and Y coordinates of the upper-left corner position of the second window are designated by the data "L2" and "H2", and so on. In this case, the X and Y coordinates are determined relatively to the upper-left corner position of the screen of which X and Y coordinates are "0, 0". The X coordinate increases in the right-hand direction, and the Y coordinate increases in the downward direction.

A command 2-4 shown in FIG. 3-(e) is provided for deleting or clearing all the windows from the screen. The command 2-4 includes data "CLR Window" indicating that this command is the command 2-4. When this command 2-4 is processed, all of the windows on the screen are cleared.

When any one of the commands 2-1 to 2-4 is processed, the contents of a corresponding portion of a window attribute table 30 (later described) are changed.

The digital information 1 thus recorded on the CD-ROM 11 is trade-off modulated in accordance with the aforesaid format. More specifically, the digital information 1 is recorded on the CD-ROM 11 such that the constant transfer rate of, for example, 150 kilobytes per second with respect to the overall digital information 1 is shared by the respective data 1-1 to 1-5, and the proportion of the share of transfer rate of each data to the constant transfer rate of the overall digital information 1 is varied in such a manner that desired display characteristics (such as a speed of motion of an image and a resolution of an image) of the image are obtained.

Referring again to FIG. 2, the digital information 1 is read from the CD-ROM 11 by a CD-ROM driver 12 and thence supplied to a video display controller (VDP) 13. The VDP 13 stores the supplied digital information 1 into buffer memories provided therein. In this case, the control data 3 are separated from the digital information 1 and stored into the window attribute table 30 (see FIGS. 4 and 5) provided in the VDP 13. The VDP 13 supplies the data 1-2 to 1-4 (FIG. 1) contained in the digital information 1 to a CRT display unit 14 in accordance with the analysis of the control data 3, whereby an image is displayed on the screen of the CRT display unit 14. The VDP 13 is also so constructed that the digital information 1 and the control data 3 thus stored therein can be changed by the CPU 15. Thus, the CPU 15 can also control the display of image on the screen of the CRT display unit 14.

Figure 4:
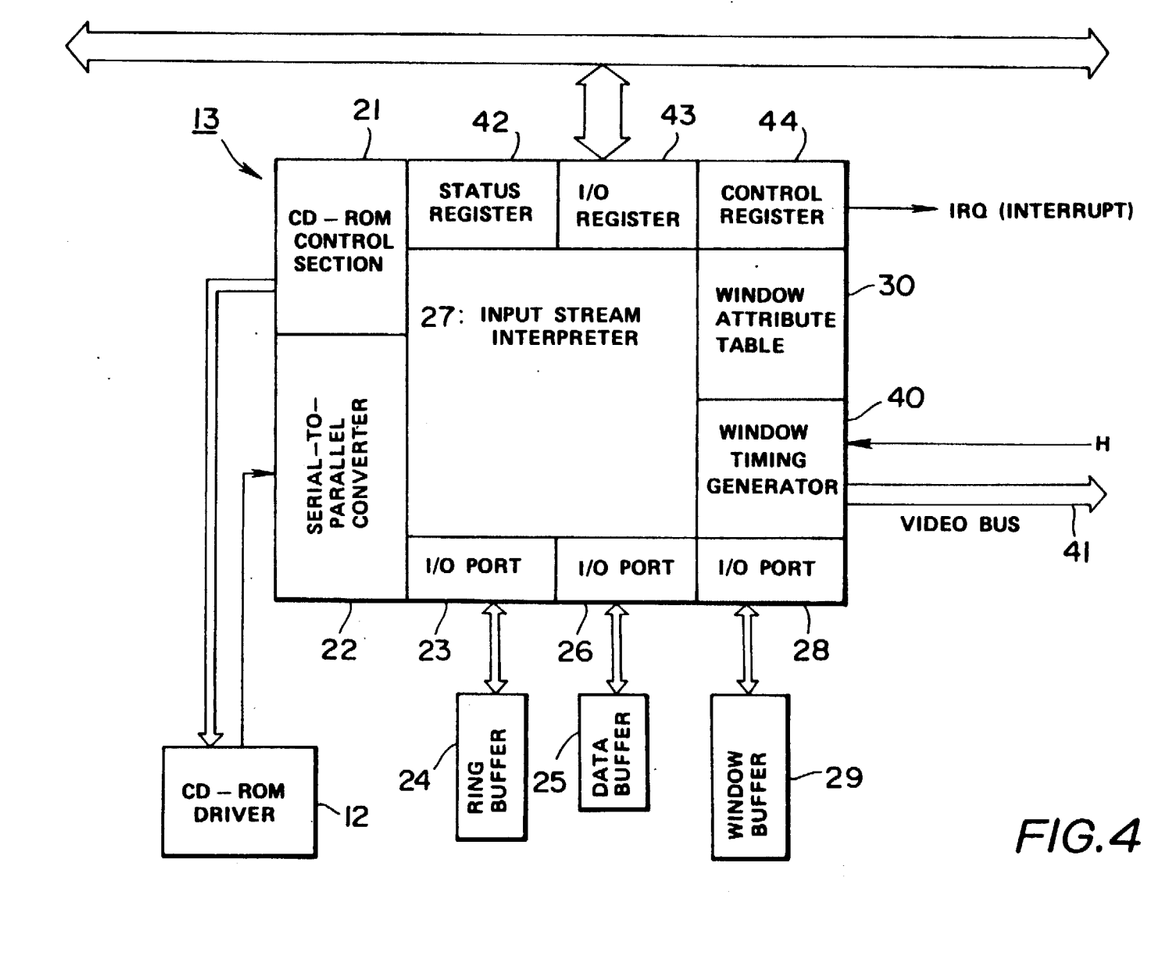
FIG. 4 is a block diagram of the video display controller (VDP) 13 of the data processing system of FIG. 2.

The VDP 13 will now be more fully described with reference to FIG. 4.

The VDP 13 comprises a CD-ROM control section 21 which controls the operation of the CD-ROM driver 12. The digital information 1 read from the CD-ROM 11 by the CD-ROM driver 12 under the control of the CD-ROM control section 21 is supplied to a serial-to-parallel converter 22. The serial-to-parallel converter 22 converts the digital information 1 in the form of a serial signal fed from the CD-ROM driver 12 into eight-bit parallel data which are temporarily stored in a ring buffer 24 of 10 kilobytes through an I/O port 23. In this case, the ring buffer 24 stores the data in the same formats as those shown in FIGS. 3-(a) to 3-(f).

A data buffer 25 of 5 kilobytes is provided for temporarily storing data to be fed to the CPU 15 or data fed from the CPU 15. Writing of data to the data buffer 25 and read-out of data from the data buffer 25 are performed by an input stream interpreter 27 through an I/O port 26.

The input stream interpreter 27 periodically reads the digital information 1 and the commands 2 stored in the ring buffer 24 and the data buffer 25, that is to say, the various data in such formats as those shown in FIGS. 3-(a) to 3-(f), and analyses them. When control data 3-1 of window data 1-3 in the format shown in FIG. 3-(a) is read, the input stream interpreter 27 writes the window data 1-3 into a window buffer 29 of 64 kilobytes through an I/O port 28 and at the same time writes the data "$X_L$" and "$Y_L$" representative of the size of the window into a corresponding portion of the window attribute table 30. When control data 3-2 of program data (or other data) 1-1 in the format shown in FIG. 3-(f) is read, the input stream interpreter 27 writes the program data (or other data) 1-1 into the data buffer 25 and at the same time writes the data "Size L" and "Size H" into a predetermined area of the data buffer 25.

Figure 5:
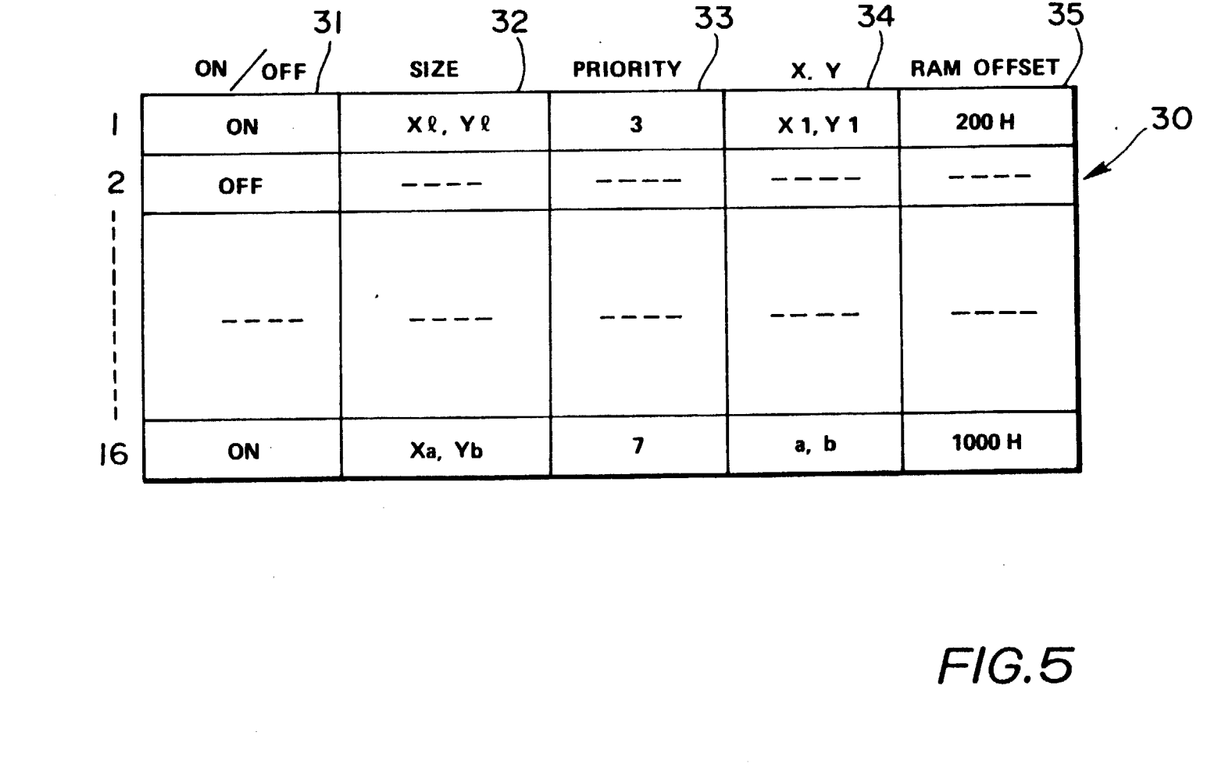
FIG. 5 is an illustration of the contents of the window attribute table 30 of the VDP 13 of FIG. 4.

The window attribute table 30 will now be more fully described.

As shown in FIG. 5, the window attribute table 30 comprises a plurality of areas 31 to 35 for storing the following items with respect to each of the sixteen windows. The area 31 stores sixteen ON/OFF bits each determining whether a respective one of the windows is to be displayed. It is understood from the ON/OFF bits shown in FIG. 5 that the first and the sixteenth windows are now displayed but the second window is not displayed. The area 32 stores the data representative of the size of each of the windows, wherein the data "$X_L$" to "$X_a$" respectively represent the horizontal lengths of the first to sixteenth windows and the data "$Y_L$" to "$Y_b$" respectively represent the vertical lengths of the first to sixteenth windows. Each of the pairs of data "$X_L, Y_L$" to "$X_a, Y_b$" is changed by a corresponding one of the control data 3-1. The area 33 stores the priorities of the first to sixteenth windows which are designated by the command 2-2. In FIG. 5, the first window is given the third priority and the sixteenth window is given the seventh priority. The area 34 stores the data representative of the X and Y coordinates "$X_1, Y_1$" to "a, b" indicative of the respective display positions of the first to sixteenth windows. All the data in this area 34 are changed by the command 2-3, and each of the data in this area 34 can be changed by the corresponding command 2-1. The area 35 stores a starting address (RAM Offset) of each memory area of the window buffer 29 in which a corresponding one of the window data 1-3 is stored. Each of the starting addresses is stored in this area 35 in hexadecimal.

Referring again to FIG. 4, a window timing generator 40 generates a horizontal clock signal of which cycle corresponds to a time interval required to display one of dots sequentially displayed on the screen in accordance with the horizontal scanning thereof. The window timing generator 40 sequentially reads the data 1-3 of the windows to be displayed from the window buffer 29 and outputs the read data to the CRT display unit 14 through a video bus 41. The horizontal clock signal generated by the window timing generator 40 is synchronized with a horizontal synchronization signal H fed from the CRT display unit 14.

The VDP 13 further comprises a status register 42 for storing data indicative of the operation status of this VDP 13, an I/O register 43 for temporarily storing data transferred to and from the CPU 15, and a control register 44 for interrupting the CPU 15.

The operation of the data processing system will now be described.

It is assumed that the compact disc 11 is recorded with the digital information 1 shown in FIG. 1.

(1) Processing of Program Data 1-1

The program data 1-1 is read from the CD-ROM 11 in accordance with the format shown in FIG. 3-(f) and supplied to the VDP 13. The program data 1-1 is sequentially stored into the ring buffer 24 through the serial-to-parallel converter 22 and the I/O port 23, and is then read from the ring buffer 24 by the input stream interpreter 27. The input stream interpreter 27 detects the control data 3-2 of the program data 1-1 from the data read from the ring buffer 24, and determines that the data which follows is program data 1-1. The input stream interpreter 27 then writes the program data -1 into the data buffer 25. When the writing of the program data 1-1 into the data buffer 25 begins, the input stream interpreter 27 interrupts the CPU 15. In response to this, the CPU 15 loads the program data 1-1 onto its own memory through the I/O register 43.

(2) Processing of Initial Image Data 1-2

The initial image data 1-2 is transferred in accordance with the format shown in FIG. 3-(a). In this case, the window number is set to "0", and the data "$X_L$" and "$Y_L$" are set to the maximum values so that the input steam interpreter 27 can determine that this data 1-2 represents an image of such a size as to be displayed on the entire screen of the CRT display unit 14. The data 1-2 is sequentially stored into the ring buffer 24 through the serial-to-parallel converter 22 and the I/O port 23, and then read from the ring buffer 24 by the input stream interpreter 27. The input stream interpreter analyses the control data 3-1 and determines that the data 1-2 represents the initial image to be displayed. The input stream interpreter 27 then writes the data 1-2 read from the ring buffer 24 into a predetermined area of the window buffer 29. The data 1-2 thus written in the window buffer 29 is sequentially read therefrom by the window timing generator 40, and supplied to the CRT display unit 14, whereby the initial image is displayed on the screen of the CRT display unit 14. The initial image is a still image, and therefore the priority of the display thereof is the lowest, so that if there are any other windows to be displayed, those windows are preferentially displayed.

(3) Processing of Window Data 1-3

The window data 1-3 is read from the CD-ROM 11 in accordance with the format shown in FIG. 3-(a). The window data 1-3 is sequentially stored in the ring buffer 24 and at the same time read therefrom by the input stream interpreter 27 in a manner described for the initial image data 1-2. The input stream interpreter 27 analyses the data 1-3 and separates the control data 3-1 from the window data 1-3. The control data 3-1 contains the window number, and the input stream interpreter 27 stores the data "$X_L$" and "$Y_L$" contained in the control data 3-1 into the area 32 of the window attribute table 30 at a position determined by the window number. The input stream interpreter 27 also reads the start address (RAM Offset) from that position of the area 35 of the window attribute table 30 which is designated by the window number, and sequentially writes the window data 1-3 into the window buffer 29 from the start address thus determined. The input stream interpreter 27 also change the ON/OFF bit in that position of the area 31 which is designated by the window number, from "0" to "1".

The window timing generator 40 periodically scans the area 31 of the window attribute table 30, and when any ON/OFF bit in the state of "1" is detected, the window timing generator 40 calculates the display position of the window corresponding to the "1" bit from the data stored in the corresponding positions of the areas 32 and 34, and outputs the corresponding window data 1-3 from the window buffer 29 to the CRT display unit 14 in such a timing that the window is displayed on the screen at the calculated position.

Thus, when each of the window data 1-3 shown in FIG. 1 is read from the CD-ROM 11, the data in the corresponding area of the window buffer 29 is renewed, and the corresponding window is displayed in accordance with the renewed data.

The tone data 1-5 read from the CD-ROM 11 in parallel with the window data 1-3 is temporarily stored in the data buffer 25 by the input stream interpreter 27. The tone data 1-5 thus stored in the data buffer 25 is read therefrom by the CPU 15 through the I/O port 26 and the I/O register 43, and generated as tones.

(4) Processing of New Image Data 1-4

The new image data 1-4 is read from the CD-ROM 11 in accordance with the same format as the initial image data 1-2. The new image data 1-4 must however be transferred in parallel with the window data 1-3, so that the transfer rate of this new image data 1-4 is set to a value which is less than one third of that of the initial image data 1-2, that is, less than 50 kilobytes per second. And therefore, it takes more than one second to complete the transfer of the data 1-4.

The new image data 1-4 is sequentially written into a predetermined area of the window buffer 29 by the input stream interpreter 27, and when the writing is completed, the data 14 is read and outputted to the CRT display unit 14 by the window timing generator 40. Thus, the new image represented by the data 1-4 is displayed in place of the initial image.

Description will now be given as to change of display characteristics by the trade-off modulation.

In this system, the transfer rate of the digital information 1 from the CD-ROM 11 to the VDP 13 is constant, so that the product of the speed of motion of an image to be displayed, the window size of the image, the number of frames of the image and the resolution of the image must be kept constant. And therefore, if one of these display characteristics should be improved, the remaining display characteristics must be sacrificed. In other words, these display characteristics must be traded off.

For example, in the case where a series of images displayed in accordance with the digital information 1 include a scene in which a motion of the image must be emphasized, the digital information 1 is recorded so that those of the window data 1-3, which correspond to the window where the motion is required, are given a large proportion of the transfer rate. With this arrangement, the time interval required to transfer those window data 1-3 corresponding to the window where the motion must be emphasized can be reduced to increase the rate of change of the window data 1-3. Thus, the motion of the image displayed within the above window can be increased. In this case, the motion of the image within the window can further be increased by decreasing the size of the window through the control data 3-1, or by reducing the amount of window data 1-3 for the window, in which case the resolution of the image is sacrificed.

In the case where a series of images displayed in accordance with the digital information 1 include a scene in which a resolution of the image must be emphasized, the digital information 1 is recorded so that those of the window data 1-3, which correspond to the window where the high resolution is required, are given a large proportion of the transfer rate. Those window data 1-3 are also so recorded as not to vary rapidly. Alternatively, the window data 1-3 may be recorded with the control data 3-1 which decreases the size of the window.

Thus, with the structure of the embodiment described above, the display characteristics of the image can be properly changed by the trade-off modulation and the suitable selection of the control data 3-1.

Description will now be given as to the change of image data by the CPU 15.

The VDP 13 is so arranged that the data in the window buffer 29 and the data in the window attribute table 30 can be changed by the CPU 15 through the I/O register 43. Thus, with this system, not only an image based on the data read from the CD-ROM 11 but also an image based on the data fed from the CPU 15 can be displayed on the CRT display unit 14.

In this case, to avoid the contention of the data from the CD-ROM 11 with that from the CPU 15, a dual I/O port is used as the I/O port 28.

What is claimed is:

1. A data processing system comprising:
digital information outputting means for outputting digital information including a plurality of groups of data at a predetermined entire transfer rate, each of said plurality of groups of data including control data for defining characteristics of said each of said plurality of groups of data, said outputting means including means for outputting different groups of data at different transfer rates, a transfer rate of each of said plurality of groups of data outputted from said outputting means varying with a lapse of time, relative to the transfer rate of at least one other group, within a range of said entire transfer rate; and
data processing means responsive to each of said plurality of groups of data for separating said control data therefrom and analyzing said separated control data, said data processing means processing each of said plurality of groups of data in accordance with results of said analysis of said separated control data.

2. A data processing system according to claim 1, wherein said data processing means comprises:
first and second memory means;
data separating means responsive to each of said plurality of groups of data fed from said data outputting means for separating said control data therefrom and for storing said each of said plurality of groups of data and said separated control data respectively into said first and second memory means;

data analyzing means for analyzing said control data stored in said first memory means; and
a data processor for processing said each of said plurality of groups of data stored in said second memory means in accordance with the result of said analysis by said data analyzing means.

3. A data processing system according to claim 2, wherein said digital information includes image data representative of an image to be displayed, said control data defining characteristics of said image.

4. A data processing system according to claim 3, wherein said data outputting means comprises an optical recording disc on which said digital information is recorded, wherein when said digital information is read therefrom the transfer rate of each of said plurality of groups of data varies with a lapse of time.

5. A data processing system as in claim 1 wherein said digital information includes image data representative of images to be displayed, wherein at least one of said plurality of groups of data comprises window data representative of a portion of an image to be displayed at any point in time.

6. A data processing system comprising:

data recording means for recording digital information including a plurality of groups of data in a configuration such that when said digital information is read therefrom at a predetermined entire transfer rate a transfer rate of each of said plurality of groups of data varies with a lapse of time relative to the transfer rate of at least one other group, each of said plurality of groups of data including control data defining characteristics thereof;

reading means for reading said digital information from said recording means at said predetermined entire transfer rate thereby to read each group of data at a transfer rate which varies with a lapse of time relative to the transfer rate of at least one other group;

first and second memory means;

data separating means responsive to each of said plurality of groups of data read by said reading means for separating said control data from said each of said plurality of groups of data, said data separating means storing said separated control data into said first memory means;

first data analyzing means for analyzing said separated control data and for storing said each of said plurality of groups of data into said second memory means at an area thereof determined in accordance with the result of said analysis;

second data analyzing means for periodically analyzing said control data stored in said first memory means and for reading said plurality of groups of data from said second memory means in accordance with the results of said analysis by said second analyzing means, to output said plurality of groups of data read from said second memory means as an output of said data processing system.

7. A data processing system according to claim 6, wherein said data recording means comprises an optical disc.

8. A data processing system according to claim 7, wherein said digital information includes image data representative of an image, at least one of said plurality of groups of data comprising window data representative of a portion of said image.

9. A data processing system according to claim 8, wherein said control data of said at least one plurality of groups of data defines display characteristics of said portion of said image.

* * * * *